United States Patent
Holihan et al.

(10) Patent No.: US 11,305,610 B2
(45) Date of Patent: Apr. 19, 2022

(54) THERMAL SYSTEM CONTROL FOR A VEHICLE

(71) Applicant: GM GLOBAL TECHNOLOGY OPERATIONS LLC, Detroit, MI (US)

(72) Inventors: Kyle Holihan, South Lyon, MI (US);
Cameron P. Smith, Milford, MI (US);
Benjamin C. Groen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 16/890,545

(22) Filed: Jun. 2, 2020

(65) Prior Publication Data
US 2021/0370742 A1  Dec. 2, 2021

(51) Int. Cl.
*B60H 1/00* (2006.01)
*B60H 1/22* (2006.01)

(52) U.S. Cl.
CPC ....... *B60H 1/0073* (2019.05); *B60H 1/00007* (2013.01); *B60H 1/00342* (2013.01); *B60H 1/00492* (2013.01); *B60H 1/00735* (2013.01); *B60H 1/00885* (2013.01); *B60H 2001/2228* (2013.01)

(58) Field of Classification Search
CPC .............. B60H 1/0073; B60H 1/00007; B60H 1/00342; B60H 1/00492; B60H 1/00735; B60H 1/00885; B60H 2001/2228
See application file for complete search history.

(56) References Cited

U.S. PATENT DOCUMENTS

| | | | | |
|---|---|---|---|---|
| 5,531,264 | A * | 7/1996 | Eike | B60H 1/00014 165/42 |
| 6,792,766 | B2 * | 9/2004 | Osborne | F24F 3/00 62/159 |
| 8,220,284 | B2 * | 7/2012 | Tsubone | B60H 1/00885 62/324.4 |
| 9,169,751 | B2 * | 10/2015 | Hussain | B60H 1/00492 |
| 9,604,627 | B2 * | 3/2017 | Yamanaka | B60W 10/30 |
| 10,131,197 | B2 * | 11/2018 | Higuchi | B60H 1/00785 |
| 10,391,839 | B2 * | 8/2019 | Kawakubo | B60H 1/2218 |
| 2010/0175413 | A1 * | 7/2010 | Tsubone | B60H 1/32284 62/324.4 |
| 2011/0016896 | A1 * | 1/2011 | Oomura | B60H 1/00921 62/155 |
| 2011/0120146 | A1 * | 5/2011 | Ota | B60H 1/03 62/3.3 |

(Continued)

*Primary Examiner* — Ljiljana V. Ciric

(57) ABSTRACT

A thermal control system includes first and second components. A plurality of coolant conduits fluidly couple the components to define a coolant circuit. A pump is operable to circulate coolant among the conduits. Within the coolant circuit, the first component is upstream of the second component and the pump is upstream of the first component. A controller is configured to selectively operate according to a circuit heating mode, wherein the controller controls the pump at a first speed and controls the first respective component as a thermal source, and a local heating mode, wherein the local heating mode the control controls the pump at a second speed and controls the first respective component as a thermal source. The second speed is less than the first speed. The controller operates in the local heating mode in response to a heating request associated with the second respective component.

5 Claims, 3 Drawing Sheets

(56) References Cited

U.S. PATENT DOCUMENTS

| | | | | |
|---|---|---|---|---|
| 2013/0192272 A1* | 8/2013 | Ranalli | ............ | B60L 50/30 |
| | | | | 62/3.3 |
| 2014/0060086 A1* | 3/2014 | Ranalli | ............ | B60H 1/00478 |
| | | | | 62/3.3 |
| 2015/0059375 A1* | 3/2015 | Oomura | ............ | F25B 30/02 |
| | | | | 62/155 |
| 2015/0089922 A1* | 4/2015 | Hussain | ............ | F01P 3/20 |
| | | | | 60/273 |
| 2015/0122472 A1* | 5/2015 | Higuchi | ............ | B60H 1/00007 |
| | | | | 165/202 |
| 2015/0183291 A1* | 7/2015 | Higuchi | ............ | B60H 1/00392 |
| | | | | 62/133 |
| 2015/0183296 A1* | 7/2015 | Ragazzi | ............ | B60H 1/2221 |
| | | | | 219/205 |
| 2015/0352923 A1* | 12/2015 | Hussain | ............ | F02G 5/02 |
| | | | | 60/320 |
| 2016/0318499 A1* | 11/2016 | Yamanaka | ............ | B60H 1/32284 |
| 2018/0029444 A1* | 2/2018 | Porras | ............ | B60H 1/034 |
| 2018/0222289 A1* | 8/2018 | Kawakubo | ............ | B60H 1/00485 |
| 2021/0101445 A1* | 4/2021 | Blatchley | ............ | B60H 1/00735 |
| 2021/0188043 A1* | 6/2021 | Smith | ............ | B60H 1/00392 |

\* cited by examiner

THERMAL SYSTEM CONTROL FOR A VEHICLE

INTRODUCTION

The present disclosure relates to motor vehicle thermal management systems, and more specifically to systems and methods for controlling the operation of thermal energy sources and sinks within a motor vehicle. Emissions standards, environmental concerns, and operator perceptions of responsiveness, smoothness and noise, vibration, and harshness (NVH), as well as operator comfort dictate many of the ways in which thermal energy within a motor vehicle is controlled. Traditionally, efficiencies have been sought within the confines of the internal combustion engines (ICE) functioning as prime movers for motor vehicles. Such advances have generally taken the form of improving combustion efficiency (maximizing combustion energy conversion into motive force), scavenging combustion thermal energy to run heating/ventilation/air conditioning (HVAC) functions, scavenging braking kinetic energy for battery recharging, and the like. The scavenging functions are often performed on dedicated heating, cooling, or electrical circuits, leading to a relatively complex series of circuits, many of which function almost entirely independent of one another.

However, even though ICEs have, and will likely continue to become, more and more efficient, substantial quantities of thermal energy are generated by the ICEs, a significant amount of which is usually rejected to the vehicle's surroundings. That is, in an ICE-powered vehicle, a surplus of thermal energy is generated by the ICE and cannot be effectively or efficiently contained within the motor vehicle. Thus, a significant amount of so-called "high quality" thermal energy is often rejected from the motor vehicle to the atmosphere. In an attempt to mitigate the inefficient use of ICEs, and to lower emissions, reduce environmental impact, and improve responsiveness, smoothness, NVH, and operator comfort, motor vehicles are increasingly relying upon electrical power for both motivation as well as management of the passenger compartment environment. However, the increasing use of electrical power, as is produced by innovative propulsion systems such as hybrid systems, batteries, fuel cells and the like, has dramatically reduced the amount, and the quality of the thermal energy generated by vehicles equipped with such innovative propulsion systems.

Accordingly, while traditional systems and methods of thermal management originally designed for ICE systems can be applied to innovative propulsion systems such as battery electric vehicles (BEVs)—which rely primarily upon a battery and electric motor-generator for propulsion—the surplus of thermal energy is much smaller than in an ICE system. Therefore, while traditional systems and methods of thermal management can operate for their intended purpose in ICE systems, there is a need for improved systems and methods of thermal management for vehicles in which the use of ICEs is reduced, and/or eliminated entirely. Thus, there is a need for new and improved thermal management systems and methods which efficiently collect, store, and distribute thermal energy to vehicle systems that need such energy, while reducing hardware cost and complexity, improving reliability, and offering improved safety and redundancy, and reduced range anxiety for motor vehicle operators.

SUMMARY

A thermal control system according to the present disclosure includes a plurality of thermal components. The thermal components include a first respective component and a second respective component, with the first respective component being selectively operable as a thermal source. The system additionally includes a plurality of coolant conduits fluidly coupling the plurality of thermal components to define a coolant circuit. The system also includes a coolant disposed in the plurality of coolant conduits. The system further includes a pump operable to circulate the coolant among the plurality of coolant conduits. Within the coolant circuit, the first component is upstream of the second component and the pump is upstream of the first component. The system further includes a controller configured to selectively operate according to a circuit heating mode and a local heating mode. In the circuit heating mode the controller controls the pump at a first speed and controls the first respective component as a thermal source, and in the local heating mode the control controls the pump at a second speed and controls the first respective component as a thermal source. The second speed is less than the first speed. The controller is configured to operate according to the local heating mode in response to a heating request associated with the second respective component.

In an exemplary embodiment, the second respective component includes a heat exchange device configured to selectively transfer thermal energy transfer between the coolant circuit and a second coolant circuit. In such embodiments, the second coolant circuit may include a cabin HVAC system, and the heating request associated with the second respective component may include a cabin heating request.

In an exemplary embodiment, the second speed comprises a minimum operational speed of the pump.

In an exemplary embodiment, in the local heating mode the controller controls the first respective component at a maximum thermal output of the first respective component.

An automotive vehicle according to the present disclosure includes a first coolant circuit fluidly coupling a first thermal component and a second thermal component. The first component is selectively operable as a thermal source, and the first coolant circuit is provided with a coolant therein. The vehicle includes a pump operable to circulate the coolant in the first coolant circuit. Within the first coolant circuit the first component is upstream of the second component and the pump is upstream of the first component. The vehicle further includes a controller configured to selectively operate according to a circuit heating mode and a local heating mode. In the circuit heating mode the controller controls the pump at a first speed and controls the first component as a thermal source, and in the local heating mode the control controls the pump at a second speed and controls the first component as a thermal source. The second speed is less than the first speed. The controller is configured to operate according to the local heating mode in response to a heating request associated with the second component.

In an exemplary embodiment, the second component comprises a heat exchange device configured to selectively transfer thermal energy transfer between the first coolant circuit and a second coolant circuit. In such embodiments, the second coolant circuit may include an HVAC system for a cabin of the automotive vehicle, and the heating request associated with the second respective component may include a cabin heating request.

In an exemplary embodiment, the second speed comprises a minimum operational speed of the pump.

In an exemplary embodiment, in the local heating mode the controller controls the first component at a maximum thermal output of the first component.

A method of controlling a thermal system according to the present disclosure includes a first coolant circuit with first and second thermal components and a pump. Within the first coolant circuit, the first component is upstream of the second component and the pump is upstream of the first component. In response to a circuit heating mode being active, the first thermal component is automatically controlled as a thermal source and the pump is automatically controlled at a first pump speed via a controller. In response to a local heating request associated with the second component, the first thermal component is automatically controlled as a thermal source and the pump is automatically controlled to reduce pump speed from the first pump speed to a second pump speed via the controller.

In an exemplary embodiment, the thermal system includes a second coolant circuit with an HVAC system and the second component includes a heat exchange device configured to selectively transfer thermal energy transfer between the first coolant circuit and a second coolant circuit. In such embodiments, the heating request associated with the second respective component includes a cabin heating request.

In an exemplary embodiment, the second pump speed is a minimum operational speed of the pump.

In an exemplary embodiment, in response to the local heating request, the first thermal component is automatically controlled at a maximum thermal output of the first component.

Embodiments according to the present disclosure provide a number of advantages. For example, a thermal control system according to the present disclosure is configured to provide rapid heating of an individual component in a fluid circuit, thereby enabling rapid heating of a vehicle cabin and in turn increasing customer satisfaction The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
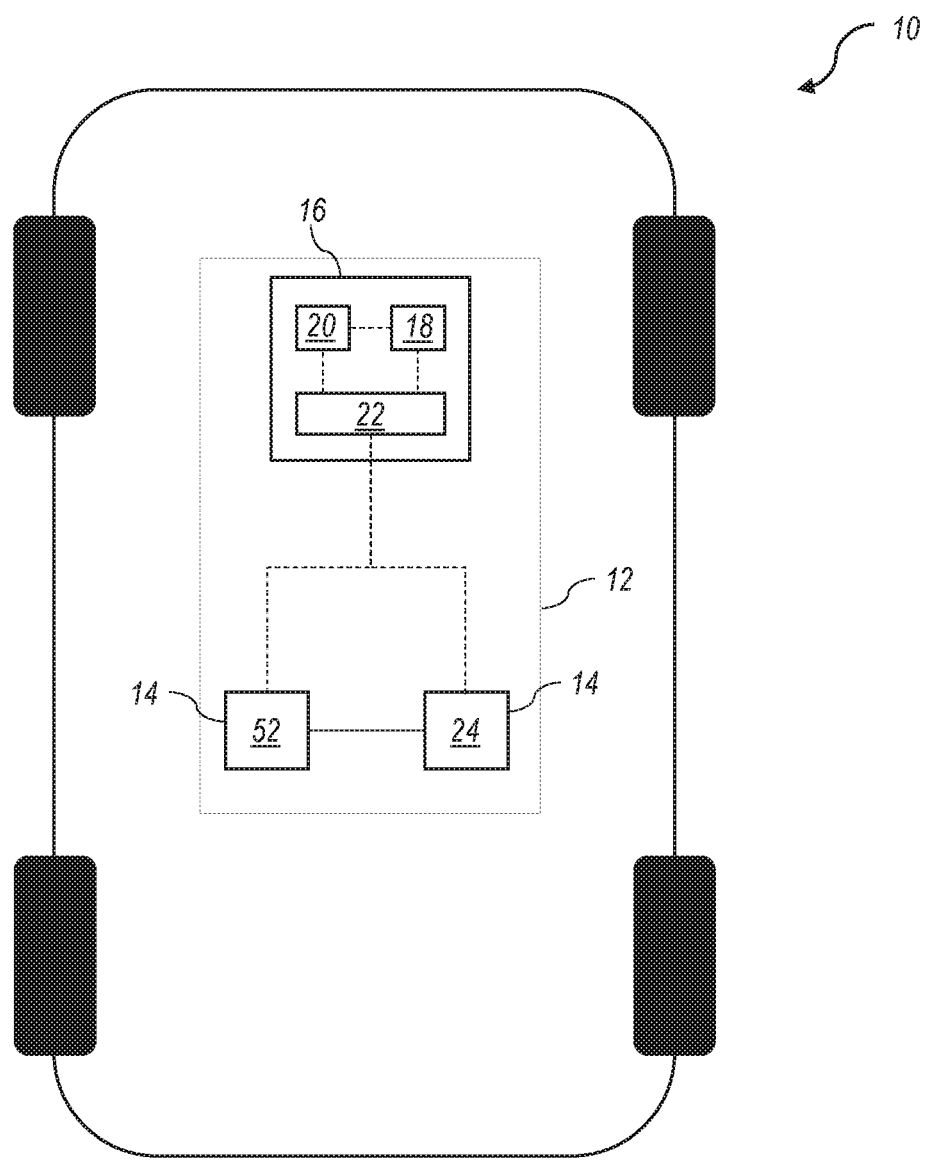
FIG. 1 is a schematic representation of a vehicle according to an embodiment of the present disclosure.

Referring to FIG. 1, a motor vehicle is shown and indicated generally by reference number 10. While the motor vehicle 10 is depicted as a car, it should be understood that the motor vehicle 10 may be a car, a truck, an SUV, a van, a semi, a tractor, a bus, a go-kart, or any other such motor vehicle 10 without departing from the scope or intent of the present disclosure. The motor vehicle 10 is equipped with a thermal management system 12. In broad terms, the thermal management system 12 operates to selectively transport thermal energy from a heat source within the thermal management system 12 to a heat sink in the thermal management system 12, or from a heat source or a heat sink to a location within the thermal management system 12 where the thermal energy is desired. The thermal management system 12 includes a plurality of dissimilar thermal fluid loops 14 for various motor vehicle 10 sub-systems. Each of the dissimilar thermal fluid loops 14 has heat sources and heat sinks associated with one or more of the motor vehicle 10 sub-systems. However, some heat sinks are significantly more massive, and therefore, capable of storing more thermal energy, than other heat sinks. Accordingly, depending on the thermal energy storage capacities of various heat sinks within the thermal management system 12, thermal energy may be moved from one of the dissimilar thermal fluid loops 14 to another.

As noted above, the vehicle 10 may circulate or transfer thermal energy via a reduced number of thermal fluid loops 14 in comparison to previous approaches. In the example illustrated in FIG. 1, the vehicle 10 circulates thermal energy generated onboard the vehicle only via the two fluid loops 14. In other words, the thermal requirements for the vehicle 10, i.e., any needs for heating or cooling of vehicle 10 components, as well as heating or cooling of the passenger compartment, may be met using only the two thermal fluid loops 14. Thermal energy may be transferred via the thermal fluid loops 14 by way of conduction, convection, or any other heat transfer mechanism that is convenient.

A controller 16 in electronic communication with a plurality of actuators, valves, and the like manages the operation of the thermal management system 12, including the plurality of dissimilar thermal fluid loops 14. The controller 16 is a non-generalized, electronic control device having a preprogrammed digital computer or processor 18, a memory or non-transitory computer readable medium 20 used to store data such as control logic, instructions, lookup tables, etc., and a plurality of input/output peripherals or ports 22. The processor 18 is configured to execute the control logic or instructions. The controller 16 may have additional processors or additional integrated circuits in communication with the processor 18 such as logic circuits for analyzing thermal management data. In some examples, the controller 16 may be better described as a plurality of controllers 16, each of which is designed to interface with and manage specific componentry within the motor vehicle 10, and each of the plurality of controllers 16 is in electronic communication with the others. However, while in some examples more than one controller 16 may be used, for ease of understanding, the following description will focus on a thermal management system 12 having only a single controller 16.

Figure 2:
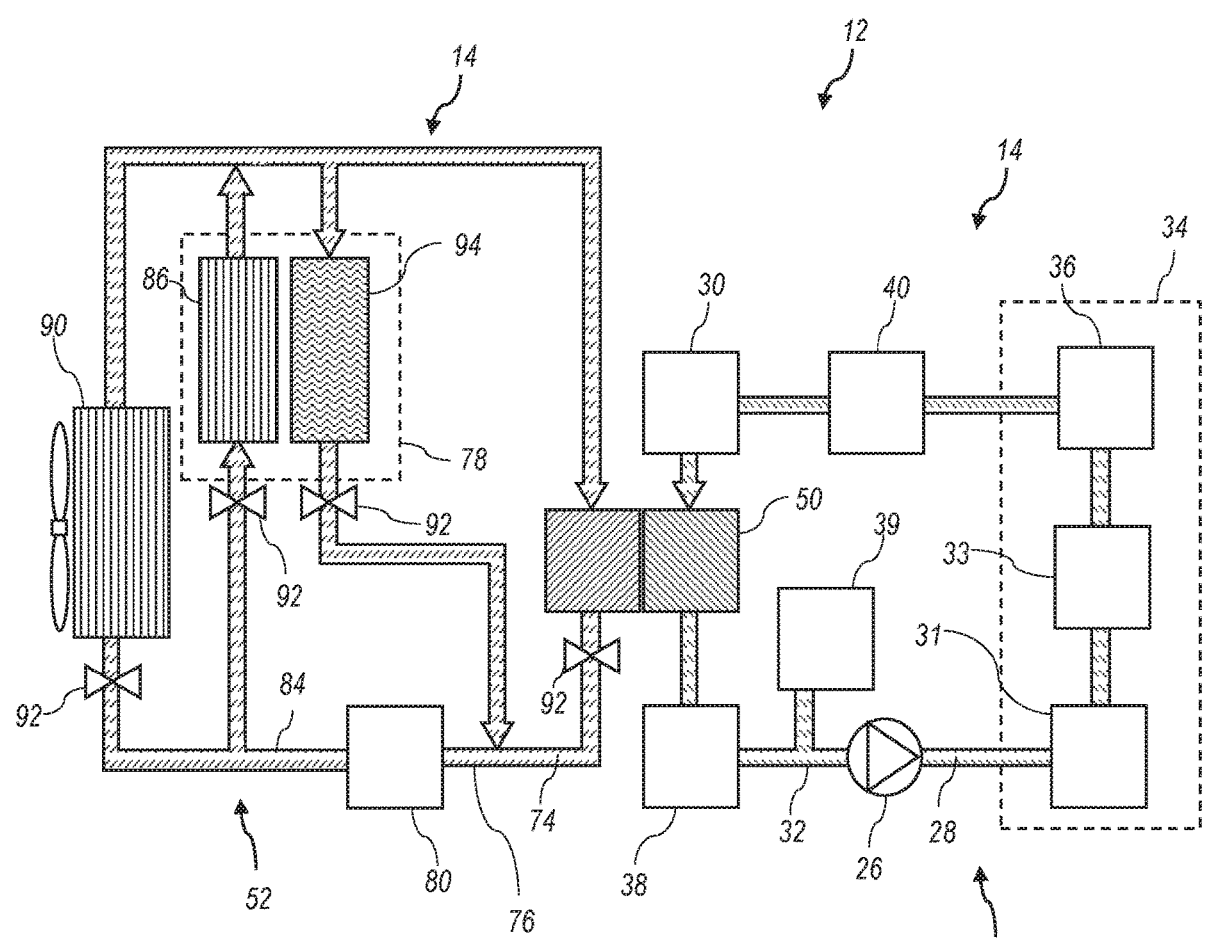
FIG. 2 is a schematic representation of a thermal management system according to an embodiment of the present disclosure.

Referring now to FIG. 2 and with continuing reference to FIG. 1, a first of the dissimilar thermal fluid loops 14 is a coolant loop 24. The coolant loop 24 includes a coolant pump 26 arranged to selectively pump coolant 28 from a coolant fill bottle 39 through a plurality of coolant conduits 32. The coolant conduits 32 are in fluid communication with a variety of coolant loop 24 components. In the illustrated embodiment, the coolant loop 24 components include an integrated power electronics (IPE) module 34. The IPE 34 is an electronic device having a variety of accessories usable by the motor vehicle operator. In the illustrated embodiment, the IPE 34 includes a power inverter/converter module 31, an accessory power module 33, and an onboard charging module (OBCM) 36. Other embodiments within the scope of the present disclosure may include one or more additional accessories in place of, or in addition to, those shown in FIG. 2. As the IPE 34 is operated, the electronics within the IPE 34 convert electrical energy into a variety of functions usable by the motor vehicle and/or operator. In addition, thermal energy is generated as a byproduct of using electrical energy within the IPE 34 devices. The coolant 28 carries the thermal energy from the IPE 34 devices elsewhere in the coolant loop 24.

As will be discussed further below, thermal energy from the IPE 34 devices may not be significant in output, and in this sense be relatively "low-quality" in comparison to sources such as an internal combustion engine. Nevertheless, as will be described further below, the thermal energy management system 12 may facilitate accumulation of such low-quality thermal energy, allowing it to be subsequently deployed to the passenger compartment or elsewhere in the vehicle 10 in a manner consistent with previous approaches using "high-quality" thermal energy sources such as internal combustion engines. Thus, despite the absence of an internal combustion engine in the vehicle 10, the thermal energy management system 12 may nevertheless have sufficient heating output.

The OBCM 36 is electrically coupled to a high-voltage battery 38. The OBCM 36 is an electrical device designed to move energy into a secondary cell or rechargeable battery 38 by forcing an electrical current through the battery 38. In some examples, a single-phase 3.5 kW to 22 kW OBCM 36 is installed within the electrical system of the motor vehicle 10 and charges the motor vehicle 10 battery 38 from a power grid. In other examples, the battery 38 of the motor vehicle 10 can be used as an energy source, and therefore, the OBCM 36 can also direct electrical energy to the electrical grid, or to accessory or ancillary devices within the motor vehicle 10. In addition, the OBCM 36 can also direct electrical energy to devices, such as cellular phones, and the like that an operator of the motor vehicle 10 may power from electrical connections within the IPE 34 of the motor vehicle 10. Thus, in some instances, the OBCM 36 is a bi-directional battery 38 charging and discharging device.

In many instances, the battery 38 is most efficiently charged when the battery 38 is heated to a predetermined target temperature. In one aspect, the predetermined target temperature is approximately 25° Celsius. However, depending on the componentry and the thermal requirements of the thermal management system 12 components, the predetermined target temperature of the battery 38 may vary. In one example, to achieve the target temperature range, the battery 38 can be heated electrically via electrical energy supplied by the OBCM 36. In the example, the controller 16 effectively overdrives the OBCM 36 or drives the OBCM 36 in a calculatedly inefficient manner so as to convert a predetermined amount of electrical energy into thermal energy, e.g., to raise the temperature of the battery 38. In another example, the battery 38 itself is charged in a calculatedly inefficient manner. That is, the battery 38 is charged inefficiently so that a portion of the electrical energy being driven into the battery 38 by the OBCM 36 is converted into thermal energy which is then stored within the mass of the battery 38 while the battery 38 is being charged. In yet another example, thermal energy is directed to the battery 38 via coolant 28 carried by the coolant loop 24 from other heat sources within and external to the coolant loop 24. In the illustrated embodiment, the coolant loop 24 includes a coolant heater 30. The coolant heater 30 is an electrically-powered heater that adds thermal energy to the flow of coolant 28, thereby aiding in bringing the battery 38 up to an optimal charging temperature. In some examples, once the battery 38 has been electrically charged sufficiently, and charged sufficiently with thermal energy the temperature of the battery 38 is regulated by the OBCM 36.

The battery 38 is electrically coupled to a motor 40. The motor 40 is configured to selectively provide drive torque to vehicle wheels, e.g. through a transmission. When providing drive torque, energy stored in the battery 38 is provided to the electric motor 40 and converted to drive torque. In some embodiments of motor vehicles 10 having regenerative braking systems, the electric motor 40 is also used as an electric generator. Under circumstances when the controller 16 and OBCM 36 determine that the battery 38 is fully charged or additional heating is otherwise desired, the electricity generated by the electric motor 40 can be converted into thermal energy and stored in the mass of the battery 38 or other thermal management system 12 components.

The coolant loop 24 additionally directs coolant 28 through a chiller 50 disposed in the second of the dissimilar thermal fluid loops 14, in particular, a refrigerant loop 52. The chiller 50 is a heat exchange device providing a means of thermal energy transfer between the coolant loop 24 and the refrigerant loop 52. The chiller 50 includes at least two passageways physically separated from one another. That is, on a first side of the chiller 50, a coolant 28 passageway (not shown) carries coolant 28 through the chiller 50 as a part of the coolant loop 24. On a second side of the chiller 50, a refrigerant passageway (not shown) carries a refrigerant 74 through the chiller 50 as a part of the refrigerant loop 52. However, it should be understood that despite the fact that the chiller 50 includes both a portion of the coolant loop 24 and the refrigerant loop 52, there is no fluid interface between coolant 28 and refrigerant 74 within the chiller 50, and thus the coolant 28 and refrigerant 74 are prevented from mixing.

The refrigerant loop 52 includes a plurality of refrigerant conduits 76 fluidly connecting a plurality of devices operable to thermally regulate a passenger compartment (not specifically shown) contained within the motor vehicle 10. The passenger compartment may be thermally isolated from other vehicle components generating heat, and may receive flows of thermal energy via one or more vents or other conduits (not specifically shown) of the HVAC system 78. The refrigerant loop 52 also carries thermal energy to and from the coolant loop 24 via the chiller 50. The refrigerant loop 52 includes a variety of operator comfort systems such as a heating, ventilation, and air conditioning (HVAC) system 78. Fundamentally, the refrigerant loop 52 has a heating function and a cooling function. Within the refrigerant loop 52, the HVAC system 78 provides heated and/or cooled air to a passenger compartment of the motor vehicle 10. Stated another way, the HVAC system 78 transports thermal energy from a cooler location to a warmer location within the refrigerant loop 52. In several aspects, the HVAC system 78 functions as a heat pump. That is, the HVAC system 78 is an air conditioner in which both heating and cooling functions are possible.

In an exemplary mode of operation, the operator of the motor vehicle 10 determines a desired passenger compartment air temperature and selects a heating cycle for the HVAC system 78. The HVAC system 78 includes a compressor 80. The refrigerant 74 enters the compressor 80 via a refrigerant conduit 76 known as a suction line 82. The compressor 80 compresses gaseous refrigerant 74, thereby increasing the temperature and pressure of the refrigerant 74. The now high-pressure, high-temperature refrigerant 74 then leaves the compressor 80 via a refrigerant conduit 76 known as a discharge line 84 and flows into a cabin condenser 86. In some aspects, the cabin condenser 86 is a heat exchange device having a plurality of condenser coils through which the refrigerant 74 flows. The coils are in contact with the passenger compartment atmosphere. An HVAC blower or fan (not shown) blows air over the cabin condenser 86, thereby releasing thermal energy from the condenser 86 into the passenger compartment atmosphere. In some aspects, the refrigerant loop 52 includes a second or exterior condenser 90. The exterior condenser 90 is in contact with the atmosphere external to the motor vehicle 10 and when engaged, releases thermal energy from the refrigerant 74 from the motor vehicle 10 to the atmosphere.

The HVAC system 78 further includes a plurality of expansion valves 92. Depending on the HVAC system 78 design parameters, the expansion valves 92 may be mechanical thermostatic expansion valves (TXV) (not specifically shown) and/or electronic expansion valves (EXV) (not specifically shown). Control over the rate of refrigerant 74 expansion can be more directly and precisely controlled with EXVs than with TXVs, however in some cases it is desirable to use TXVs for reasons of cost, simplicity, and so forth. Condensed, pressurized, and still somewhat warm refrigerant 74 received from the cabin condenser 86 and/or exterior condenser 90 is routed through an expansion valve 92. As the refrigerant 74 is de-pressurized by the expansion valve 92, the refrigerant 74 cools. The refrigerant 74 then passes through an evaporator 94. The evaporator 94 is a heat exchange device in which a series of refrigerator coils (not shown) carry a flow of cooled refrigerant 74. The refrigerator coils exchange thermal energy with the passenger compartment atmosphere. The HVAC blower or fan blows air over the cabin evaporator 94 thereby cooling the passenger compartment of the motor vehicle 10. The refrigerant 74, having passed through the evaporator 94 is then directed back through the compressor 80. Refrigerant 74 is also selectively passed through an expansion valve 92 downstream of the chiller 50 where thermal energy is either obtained from or released to the coolant loop 24, depending on the relative temperatures of the coolant 28 and the refrigerant 74, and the thermal requirements of the battery 38 and other thermal management system 12 componentry.

In one example, the HVAC system 78 can be operated intermittently or continuously by occupants in the passenger compartment, or by the controller 16 depending on optimal heating and/or cooling requirements of the passenger compartment, or optimal heating and/or cooling requirements of other thermal management system 12 components. In one example, the HVAC system 78 operates continuously as a heat pump. As previously discussed, while operating as a heat pump, the HVAC system 78 directs refrigerant 74 through the cabin condenser 86, thereby rejecting the thermal energy in the refrigerant 74 to the passenger compartment and cooling the refrigerant 74. However, because the refrigerant loop 52 exchanges thermal energy with the coolant loop 24 in the chiller 50, a temperature of the refrigerant 74 in the refrigerant loop 52 remains substantially above the freezing point of water. Therefore, while refrigerant 74 passing through the cabin condenser 86 and the exterior condenser 90 rejects thermal energy, and is thereby cooled, thermal energy is also obtained as the refrigerant 74 passes through the chiller 50. Thus, because the temperature of the refrigerant 74 remains substantially above the freezing point of water, the cabin condenser 86 remains substantially free of ice accumulation. Similarly, in a second example, the controller 16 directs refrigerant 74 through the exterior condenser 90 where the refrigerant 74 is cooled by rejecting thermal energy to the atmosphere, but because the refrigerant 74 also flows through the chiller 50, a temperature of the refrigerant 74 remains substantially above the freezing point of water. Therefore, in both the first and second examples, ice is prevented from forming on both the cabin and exterior condensers 86, 90 even if one, the other, or both the cabin and exterior condensers 86, 90 are used continuously. Moreover, even if ice does begin to accumulate on the cabin and exterior condensers 86, 90, the controller 16 directs thermal energy from one of the thermal energy reservoirs in the coolant loop 24 to the chiller 50, and using the expansion valves 92, through the interior and/or exterior condensers 86, 90, thereby melting any accumulation of ice as needed.

Conventional vehicles having an internal combustion engine may include one or more additional fluid circuit loops, e.g. a lubricant loop for the internal combustion engine. However, in the illustrated embodiment of a battery electric vehicle 10, no internal combustion engine is provided and therefore no such loops are present.

Prior art thermal management systems teach that heating of a component in a thermal loop is achieved by heating the entire thermal loop. This may be accomplished by transferring thermal energy from a component in the loop to the thermal fluid in the loop, and circulating the thermal fluid in the loop to raise the temperature of components in the loop.

While prior art systems may provide satisfactory operation in many situations, under some conditions such systems may not increase the temperature of the desired component(s) for heating at an adequate rate. Such conditions may include when one or more components are relatively large thermal sinks, when one or more components are relatively small thermal sources, or a combination thereof. Under such conditions, it may take a relatively long time for adequate thermal energy to be transferred to the component for heating. One example of such conditions is a cold start of a BEV at low ambient temperatures, in which there may be inadequate thermal energy provided to provide satisfactory heating to the cabin.

As will be described in further detail below with respect to FIGS. 3 and 4, embodiments according to the present disclosure employ a novel control scheme to achieve localized heating of particular components within a thermal loop without raising the temperature of an entire loop.

Figure 3:
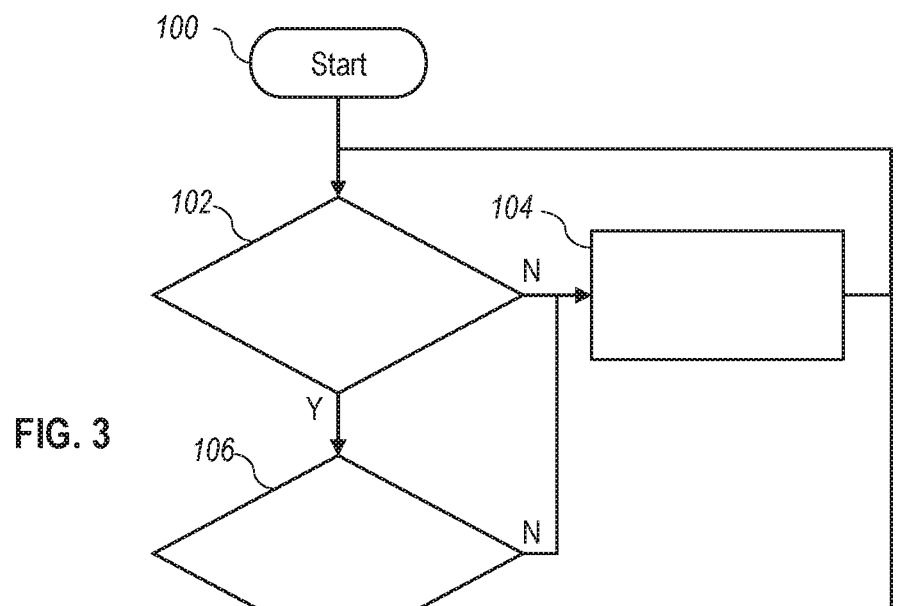
FIG. 3 is a flowchart representation of a method of controlling a thermal management system according to a first embodiment of the present disclosure.

Referring now to FIG. 3, a first method of controlling a thermal management system, e.g. the thermal management system 12, is illustrated in flowchart form. The method begins at block 100, e.g. at a beginning of a drive cycle for the vehicle 10.

A determination is made of whether component heating is requested, as illustrated at operation 102. In an exemplary embodiment, the component heating request is a cabin heating request based on an operator input, e.g. via an in-cabin HMI, or any other cabin heating request. In another exemplary embodiment, the component heating request is a battery heating request associated with the battery 38, e.g. to elevate the battery 38 to desirable operating temperatures.

In response to the determination of operation 102 being negative, i.e. no component heating being requested, then the controller 16 operates the thermal management system 12 according to a standard thermal operation mode as illustrated at block 104. The standard thermal operation mode may include, for example, controlling the thermal management circuit to provide collective heating or cooling of all components in the coolant loop 24. An example of such standard operation is described in co-pending U.S. patent application Ser. No. 16/100,639. In at least one mode of operation, which may be referred to as a circuit heating mode, the coolant heater 30 is controlled to transfer thermal energy to the coolant 28, and the pump 26 is controlled to circulate the coolant 28 throughout the coolant loop 24 to heat all components in the coolant loop 24.

The method then returns to block 102, such that the method is a continuous loop.

In response to the determination of operation 102 being positive, i.e. component heating being requested, then a determination is made of whether the heating power required to satisfy the request exceeds available heating power under standard thermal operation, as illustrated at operation 106. In an exemplary embodiment, the available heating power under standard thermal operation is calculated as a sum of heating power deliverable by the coolant heater 30 and thermal energy transferable from various components of the coolant loop 24, such as the battery 38 or IPE module 34.

In response to the determination of operation 106 being negative, i.e. the available heating power under standard thermal operation is at least equal to the heating power required to satisfy the request, then control proceeds to block 104 and the controller 16 operates the thermal management system 12 according to a standard thermal operation mode.

In response to the determination of operation 106 being positive, i.e. the available heating power under standard thermal operation is less than the heating power required to satisfy the request, then control proceeds to block 108. At block 108, the controller 16 controls the pump 26 at a minimum operational pump speed of the pump 26, i.e. the lowest non-zero speed at which the pump 26 is configured to operate. Control then proceeds to block 110.

At block 110, the controller 16 controls the power of the coolant heater 30 to provide localized heating to the desired component. In an exemplary embodiment, the power of the coolant heater 30 is controlled based on a PID control scheme in response to a difference between the desired temperature for the component and the current temperature of the component. Because the pump 26 is operated at the minimum operational speed, the temperature of the coolant 28 increases significantly in the area immediately downstream of the coolant heater 30 rather than heating the entire coolant circuit 24 evenly.

Control then returns to operation 102, such that the method is a continuous loop.

In this manner, the component associated with the heating request may be quickly heated to the desired temperature, and control may transition to standard thermal operation when the available heat from such standard operation is able to satisfy the heating request.

Figure 4:
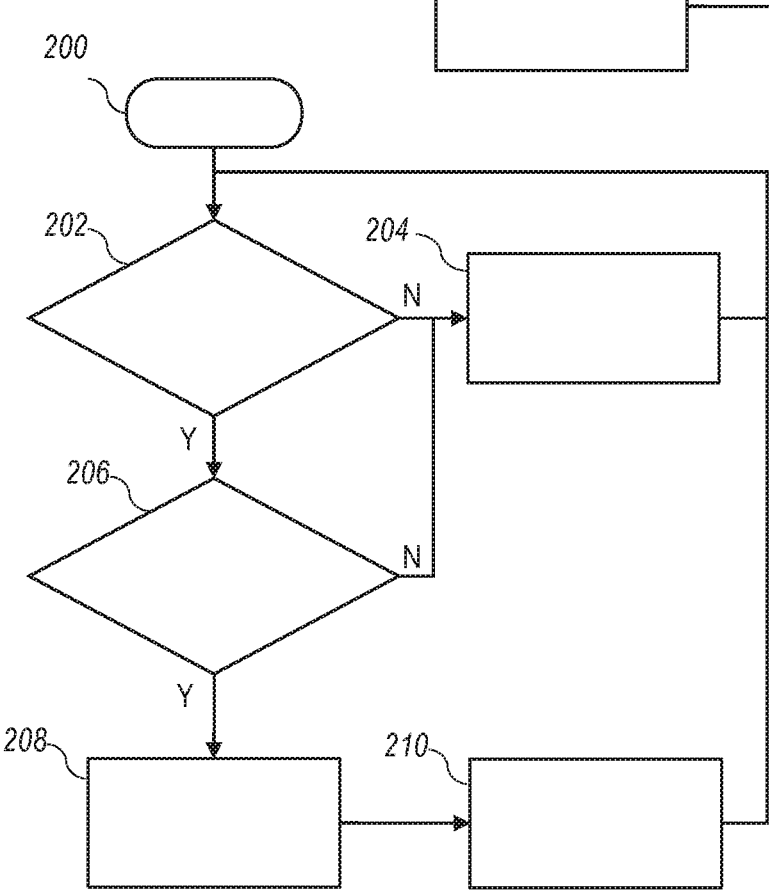
FIG. 4 is a flowchart representation of a method of controlling a thermal management system according to a second embodiment of the present disclosure.

Referring now to FIG. 4, a second method of controlling a thermal management system, e.g. the thermal management system 12, is illustrated in flowchart form. The method begins at block 200, e.g. at a beginning of a drive cycle for the vehicle 10.

A determination is made of whether component heating is requested, as illustrated at operation 202. This determination may be generally similar to that of operation 102 of FIG. 3 as discussed above. In response to the determination of operation 202 being negative, i.e. no component heating being requested, then the controller 16 operates the thermal management system 12 according to a standard thermal operation mode as illustrated at block 204. The standard thermal operation mode may be generally similar to that of block 104 in FIG. 3 as discussed above. The method then returns to block 202, such that the method is a continuous loop.

In response to the determination of operation 202 being positive, i.e. component heating being requested, then a determination is made of whether the heating power required to satisfy the request exceeds available heating power under standard thermal operation, as illustrated at operation 206. This determination may be generally similar to that of operation 106 in FIG. 3 as discussed above. In response to the determination of operation 206 being negative, i.e. the available heating power under standard thermal operation is at least equal to the heating power required to satisfy the request, then control proceeds to block 204 and the controller 16 operates the thermal management system 12 according to a standard thermal operation mode.

In response to the determination of operation 206 being positive, i.e. the available heating power under standard thermal operation is less than the heating power required to satisfy the request, then control proceeds to block 208. At block 208, the controller 16 controls the coolant heater 30 at a maximum operational heater power of the heater 30, i.e. the highest power at which the coolant heater 30 is configured to operate. Control then proceeds to block 210.

At block 210, the controller 16 controls the speed of the pump 26 to provide localized heating to the desired component. In an exemplary embodiment, the speed of the pump 26 is initially reduced to a minimum operational speed and increased in response to a difference between the desired temperature for the component and the current temperature of the component.

Control then returns to operation 202, such that the method is a continuous loop.

In this manner, the component associated with the heating request may be quickly heated to the desired temperature, and control may transition to standard thermal operation when the available heat from such standard operation is able to satisfy the heating request. FIGS. 3 and 4 are thereby alternate methods of achieving rapid localized heating.

Additional embodiments are contemplated within the scope of the present disclosure. As a nonlimiting example, rather than fixing the speed of the pump at the minimum and varying power of the coolant heater or fixing the power of the coolant heater and varying speed of the pump, the pump speed and heater power may be controlled together to achieve localized heating.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A thermal control system comprising:
a plurality of thermal components including a first respective component and a second respective component, the first respective component being selectively operable as a thermal source;
a plurality of coolant conduits fluidly coupling the plurality of thermal components to define a coolant circuit;
a coolant disposed in the plurality of coolant conduits;
a pump operable to circulate the coolant among the plurality of coolant conduits, wherein within the coolant circuit the first component is upstream of the second component and the pump is upstream of the first component; and
a controller configured to selectively operate according to a circuit heating mode and a local heating mode, wherein in the circuit heating mode the controller controls the pump at a first speed and controls the first respective component as a thermal source and wherein in the local heating mode the control controls the pump at a second speed and controls the first respective component as a thermal source, the second speed being less than the first speed, and wherein the controller is configured to operate according to the local heating mode in response to a heating request associated with the second respective component.

2. The thermal control system of claim 1, wherein the second respective component comprises a heat exchange device configured to selectively transfer thermal energy transfer between the coolant circuit and a second coolant circuit.

3. The thermal control system of claim 2, wherein the second coolant circuit comprises a cabin HVAC system, and wherein the heating request associated with the second respective component comprises a cabin heating request.

4. The thermal control system of claim 1, wherein the second speed comprises a minimum operational speed of the pump.

5. The thermal control system of claim 1, wherein in the local heating mode the controller controls the first respective component at a maximum thermal output of the first respective component.

* * * * *